United States Patent [19]

Etievant

[11] Patent Number: 5,095,486
[45] Date of Patent: Mar. 10, 1992

[54] FREE ELECTRON LASER WITH IMPROVED ELECTRONIC ACCELERATOR

[75] Inventor: Claude Etievant, Versailles, France

[73] Assignee: Commissariat a l'Energie Atomique, Paris, France

[21] Appl. No.: 554,416

[22] Filed: Jul. 19, 1990

[30] Foreign Application Priority Data

Jul. 27, 1989 [FR] France ................... 89 10144

[51] Int. Cl.⁵ ........................................... H01S 3/00
[52] U.S. Cl. ........................................ 372/2; 372/37
[58] Field of Search ................................. 372/2, 37

[56] References Cited

U.S. PATENT DOCUMENTS 4,939,740 7/1990 Goforth ..................... 372/2

FOREIGN PATENT DOCUMENTS 2065363 6/1981 United Kingdom .
8809597 12/1988 World Int. Prop. O. .

OTHER PUBLICATIONS

Nuclear Instruments & Methods in Physics Research, vol. A250, No. 1/2, Sep. 1986, pp. 278-282, Tang et al.

Primary Examiner—James W. Davie
Attorney, Agent, or Firm—Oblon, Spivak, McClelland, Maier & Neustadt

[57] ABSTRACT

A free electron laser having an electron source, and an electron accelerator and providing an electrode beam along with a magnetic wiggler traversed by the electron beam and mirrors on each side of the wigglers characterized in such a way that the electron accelerator has a coaxial structure formed by an external conductor and an internal conductor. A high frequency source supplies the cavity of the coaxial structure with an electromagnetic field at the resonant frequency. The radial component of the field has a maximum in at least one plane which is perpendicular to the axis with the external conductor and the internal conductors of the cavity having diametrically opposed openings located in the plane in order to introduce the electron beam into the cavity. An electron deflector deflects the beam which has traversed the cavity along a particular diameter while keeping the beam in the aforementioned plane and then reinjecting the beam back into the cavity along another diameter.

7 Claims, 6 Drawing Sheets

FREE ELECTRON LASER WITH IMPROVED ELECTRONIC ACCELERATOR

BACKGROUND OF THE INVENTION

1. Field of the Invention

The present invention relates to a free electron laser with an improved electron accelerator. It is used in the production of coherent radiation in a range extending from the submillimetre to the near infrared.

2. Discussion of the Background

A prior art free electron laser is diagrammatically shown in FIG. 1. It comprises an electron source K producing an electron beam, an accelerating structure ACC accelerating said beam to relativistic velocities, deviators DEV1, DEV2, making it possible to introduce the accelerated beam into a magnetic structure which is called a wiggler and which is formed from periodically alternating magnets. The electron beam undergoes a series of deflections in alternating directions within said wiggler. At the output, the electron beam is again deflected by a deviator DEV3 and is finally absorbed by an attenuator A. The wiggler is surrounded by two mirrors M1 and M2.

In the represented variant, an oscillator OSC supplies an electromagnetic beam L1, which passes through the wiggler. The latter is the seat of an interaction between the electron beam and the electromagnetic beam. If certain conditions are respected, the electromagnetic beam is amplified at the expense of the energy of the electron beam. An intense, coherent laser beam L2 is emitted and directed towards the use means.

A free electron structure can also function as an oscillator. In this case, the mirrors M1 and M2 are parallel and form a resonant cavity. The oscillator OSC is naturally absent in this case.

Hereinafter the word "laser" is consequently understood to mean both an amplifier and an oscillator.

A description of this device appears in U.S. Pat. No. 3,882,410.

The optimization of the operation of a free electron laser is partly based on the parameters of the electron beam injected into the wiggler. Among these parameters are the intensity of the beam, the energy of the electrons, the dispersion of the velocities and the diameter of the beam.

In the hitherto known electron lasers, various accelerating structures are used, such as:
linear accelerators for energies between 20 and 120 MeV,
linear induction accelerators from 0.5 to 5 MeV,
electrostatic accelerators (of the Van de Graaff type) from 3 to 6 MeV,
diode supplied by a Marx generator from 0.15 to 1 MeV,
storage rings from 150 to 540 MeV,
microtrons from 100 to 150 MeV.

For example, in GB-A-2 065 363 use is made of a linear accelerator (or linac/catalac), whilst a microtron is used in the article "Proposal for FEL Experiments Driven by the National Bureau of Standard's CW Microtron".

Although accelerators are suitable from certain aspects, they still suffer from disadvantages. In particular, their complexity is such that it is difficult to produce an industrial laser, i.e. having reduced overall dimensions, a low cost and a good reliability. Moreover, the energy efficiency of conventional accelerators is not very high, whilst the energy dispersion of the accelerated electrons is excessive. Thus, the free electron laser has hitherto remained a laboratory tool.

Moreover, the accelerators used in the last two documents referred to hereinbefore suffer from the problem of switching of the electron beam. Thus, in these devices, the electron beam follows a common trajectory portion in the accelerator (no matter whether it is a linac or microtron) and must cover different trajectories on the outside. This makes it necessary for mixing and separating devices for the electron beams.

SUMMARY OF THE INVENTION

The object of the present invention is to obviate these disadvantages. It therefore proposes the application to the free electron laser of a per se known, special electron accelerator. Such an accelerator is particularly compact, is flexible in use and is simple and economic to use. It supplies an intense electron beam with a low energy dispersion, which makes it possible to obtain optimum interaction conditions in the wiggler and thus increase the efficiency of the laser.

Moreover, in the accelerator used according to the invention, which can also be used as a decelerator, the trajectory or path followed by the accelerated electrons is separate from that followed by the decelerated electrons, which obviates the aforementioned "switchings".

Finally, the accelerator recommended by the invention operates at a lower frequency than the other accelerators mentioned (the microtron operating at 2380 MHz and the linac or catalac at 358 MHz) compared with 180 MHz for the accelerator according to the invention. Thus, the accuracy on the length of the electron trajectories for maintaining the phase conditions in acceleration and deceleration is much more easy to satisfy in the case of the invention.

According to the present invention, the accelerator is a coaxial structure with multiple passages, which the Applicant has described and claimed in French patent application FR-A-2 616 032. The application range of said accelerator was hitherto limited to the irradiation of various substances such as agroalimentary products, either directly by accelerated electrons, or by X-rays obtained by conversion on a heavy metal target.

The accelerating structure used by the invention, apart from the advantages referred to hereinbefore, permits various interesting variants. Thus, the laser can comprise a means for the recovery of the residual energy of the electron beam leaving the magnetic wiggler, said means incorporating an electron decelerator constituted by a coaxial structure with multiple passages identical to those of the accelerator, the beam leaving the wiggler being injected into the said decelerator with a phase condition corresponding to a deceleration. This decelerating structure can be separate from or coincide with the accelerating structure.

The accelerating structure adopted by the invention also permits embodiments using a storage ring, the wiggler being placed in one of the arms of the ring.

These embodiments are very advantageous, because they make it possible to obtain very high efficiency levels. The accelerating cavity, under steady state conditions, only serves to compensate the energy radiated by the electron beam in the laser.

Such an apparatus is considered difficult to produce in the aforementioned British patent 2 065 363, p.3, lines 25–35, due to the increase or widening of the velocity distribution of the electron beam. This possibility is also not envisaged in the prior art.

The use of the coaxial accelerator according to the invention makes it possible to easily surmount this difficulty because the coaxial cavity, coupled to a storage ring, has an excellent longitudinal stability, which leads to an energy rearrangement of the electrons, whose distribution has been increased by the interaction undergone in the wiggler.

BRIEF DESCRIPTION OF THE DRAWINGS

The invention is described in greater detail hereinafter relative to non-limitative embodiments and the attached drawings, wherein show.

DETAILED DESCRIPTION OF THE PREFERRED EMBODIMENTS

Figure 1:
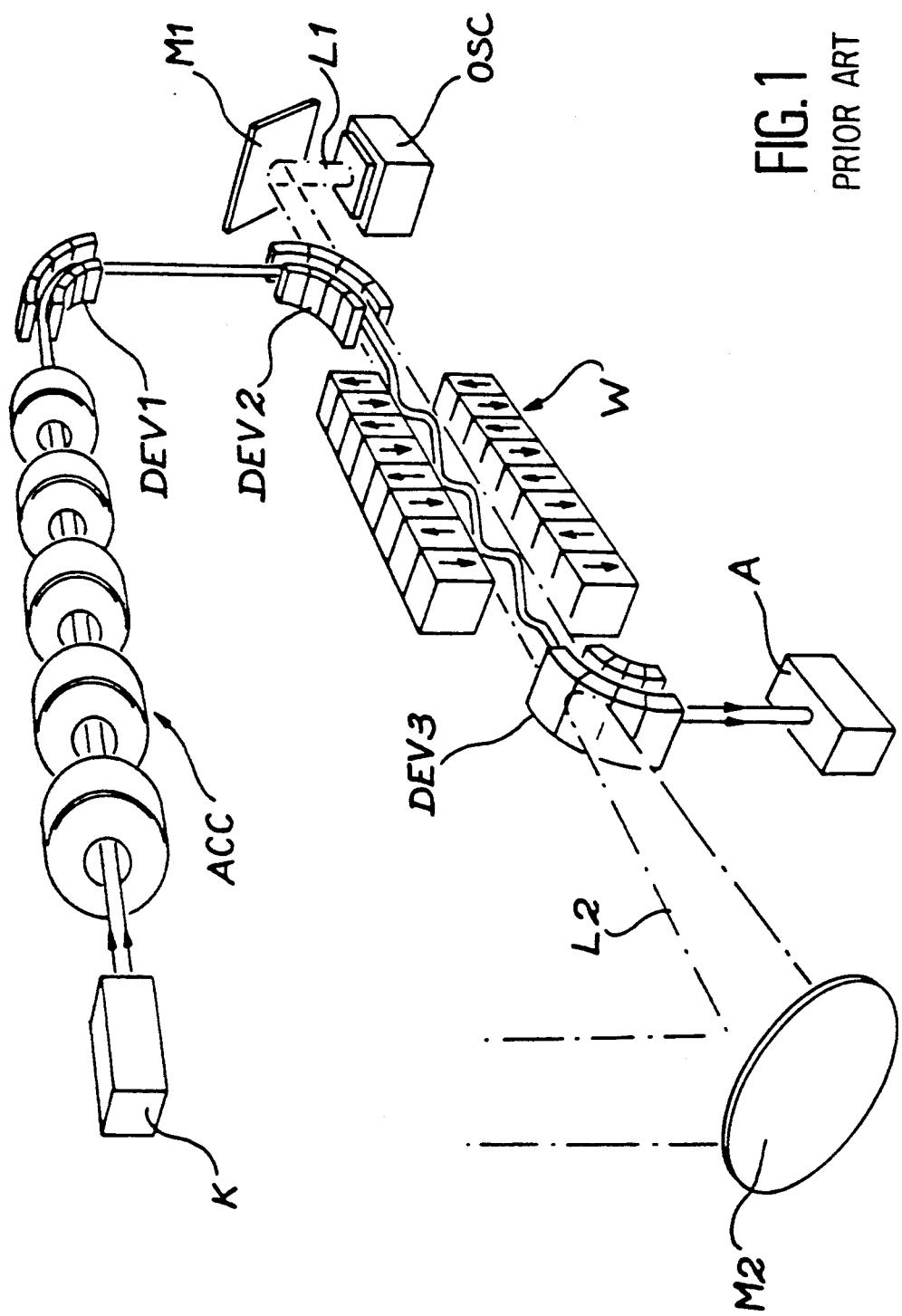
FIG. 1 Already described, diagrammatically a prior art free electron laser.
Figure 2:
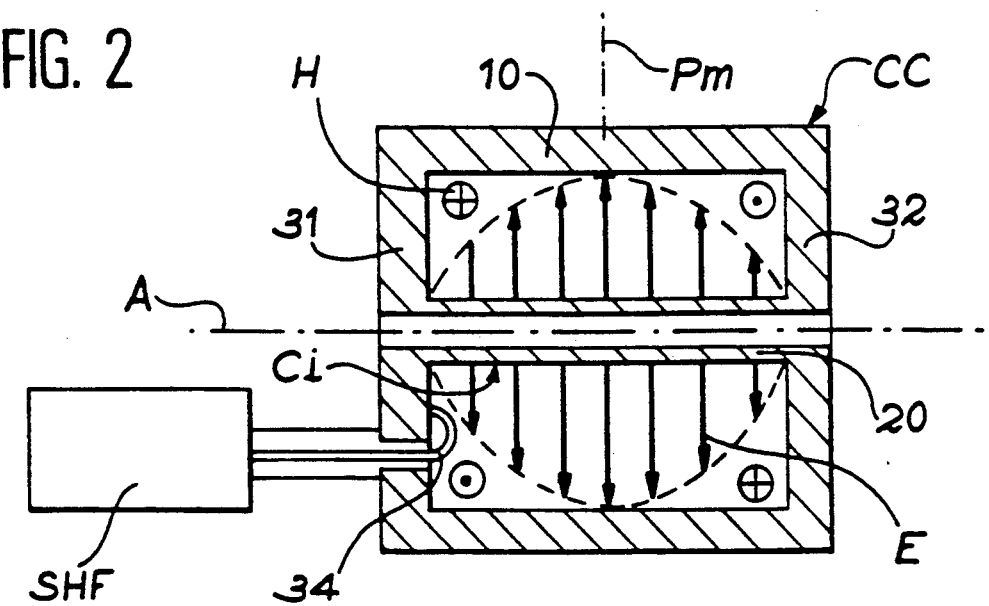
FIG. 2 In longitudinal section a coaxial resonant cavity according to the fundamental mode.
Figure 3:
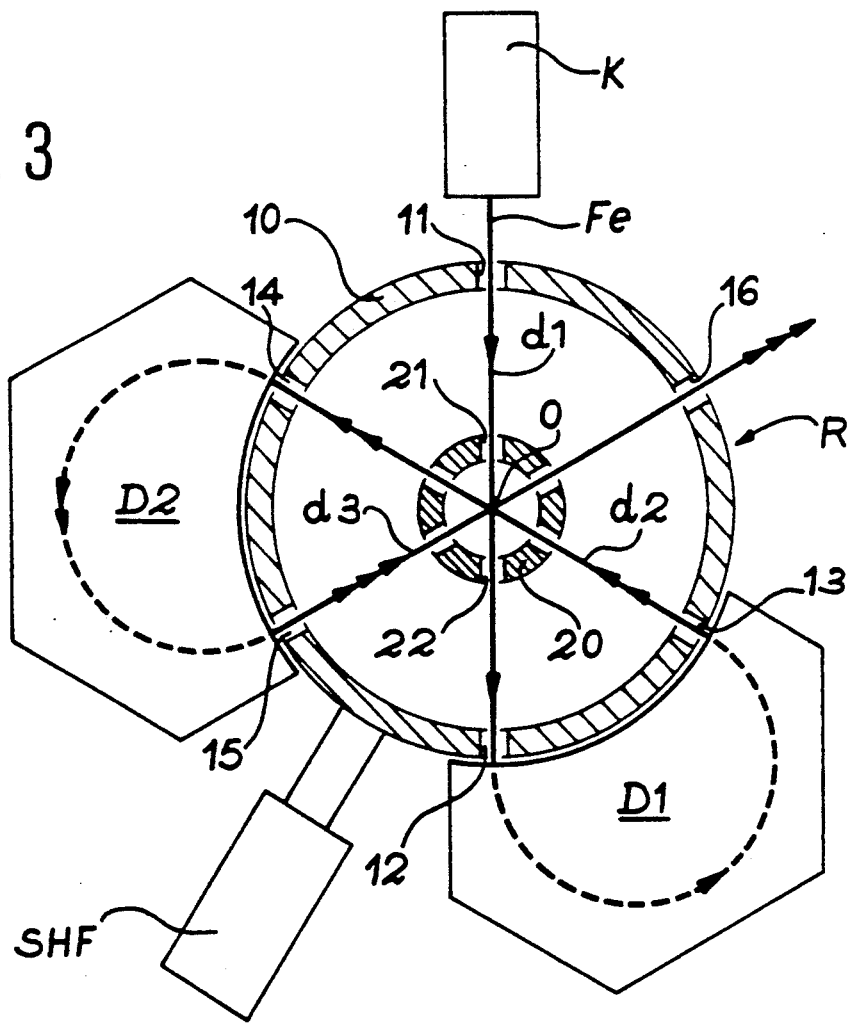
FIG. 3 An accelerating structure in cross-section.

FIGS. 2 and 3 illustrate the structure and the operation of the accelerating structure according to the invention in the application to free electron lasers.

FIG. 2 shows a coaxial cavity CC constituted by an external cylindrical conductor 10, an internal cylindrical conductor 20 and two sides 31 and 32. Such a cavity has an axis A and a median plane Pm perpendicular to said axis. Among all the possible resonance modes for such a cavity, there is a single or so-called fundamental mode of the transverse electric type for which the electric field E is purely radial in the median plane and decreases on either side thereof and is eliminated at the sides or edges 31, 32. Conversely, the magnetic field is at a maximum along the sides and is eliminated in the median plane on changing direction. In this resonance mode, the height of the cavity is equal to $\lambda/2$, if $\lambda$ is the wavelength of the electromagnetic field established in the cavity.

There are other resonance modes for which instead of one there are n maxima of the transverse radial component (n>1). The height of the cavity is then equal to $n\lambda/2$. For example, it is possible to have two planes, where the radial component of the electric field is at a maximum, with a cavity of height $\lambda$, the two planes being spaced by $\lambda/4$ from the two sides.

The cavity CC is supplied from a high frequency source SHF by a loop 34.

The electron beam is injected into the coaxial cavity in a plane where the radial electric field is at a maximum. Thus, it is in such a plane that there is no interfering magnetic field liable to deflect the beam.

In the case of a $\lambda/2$ resonant cavity in the manner illustrated in FIG. 2, the beam is injected into the median plane Pm. However, it will be shown in connection with FIG. 7, that a case exists where the cavity resonates in $\lambda$ and where two different planes are used.

FIG. 3 diagrammatically shows a complete accelerator. It is possible to see the high frequency source SHF, the electron source K, a coaxial cavity CC formed by an external cylindrical conductor 10 and an internal cylindrical conductor 20, as well as two electron deflectors D1 and D2.

The apparatus operates in the following way. The electron source K emits an electron beam Fe directed in a plane perpendicular to the axis of the coaxial cavity CC. The beam enters the cavity through an opening 11 and traverses it in accordance with a first diameter D1 of the external conductor. The internal conductor 20 has two diametrically opposite openings 21 and 22. The electron beam is accelerated by the electric field if the phase and frequency conditions are satisfactory (the electric field must be in the opposite sense to the electron velocity).

The accelerated beam passes out of the cavity through an opening 12 diametrically opposite to the opening 11 and is then deflected by a deflector D1.

The beam is reintroduced into the coaxial cavity through an opening 10 and then follows a second diameter D2 and undergoes a second acceleration in said cavity. It passes out through the opening 14 and is then again deflected by a deflector D2 and reintroduced into the cavity through an opening 15. It follows a third diameter D3 and then undergoes a third acceleration, etc.

The coaxial character of the acceleration structure means that the electric field does not have the same direction in the first and second halfs of the path taken by the electrons in the cavity, or in other words along the radius extending from the external to the internal conductor and then the radius extending from the internal to the external conductor. The spatial variation of the field is accompanied by a time variation, because the field has a high frequency (in practice a few hundred megahertz). These two variations are utilized by injecting the beam with a phase condition such that the electric field is cancelled out at the instant when the electrons traverse the central conductor. The time taken by the electrons for passing from one conductor to the other must be below the half-cycle of the field. The time taken by the electrons for traversing the complete cavity is consequently below the cycle of the field. As the electrons have quasi-relativistic velocities, it is necessary to have $d2/c < T$, in which c is the speed of light. This condition can be rewritten in form $d2 \leq \lambda$ in which $\lambda$ is the wavelength of the electromagnetic field.

If l is the length of the path taken by the electrons outside the cavity and in particular in the deflector, it is necessary to have a supplementary condition in the form $d2+l=k$, in which k is an integer. In order to reduce the overall dimensions of the apparatus, it is desirable to use $k=1$. However, in certain special cases, it may be necessary to choose $k=2$.

In order to have an acceleration and not a deceleration of the electrons, it is necessary to inject the beam at a given time of the electromagnetic field cycle. On taking for the reference phase the cycle instant where the field is at a maximum and by designating as 0 the point of the plane Pm located on the axis A, the phase condition imposes that the electrons pass into 0 when the field phase is equal to $3\pi/2$ (to within $2k\pi$), which leads to an acceleration on the preceding radius (the field being directed in the direction opposite to the velocity or speed) and on the following radius (where the field, after being reversed, is then opposite to the velocity or speed). Conversely, if the electrons pass into 0 when the phase is equal to $\pi/2$ (to within $2k\pi$), there will be a deceleration all along the passage, the latter being neutral for a phase equal to $\pi$.

Figure 4:
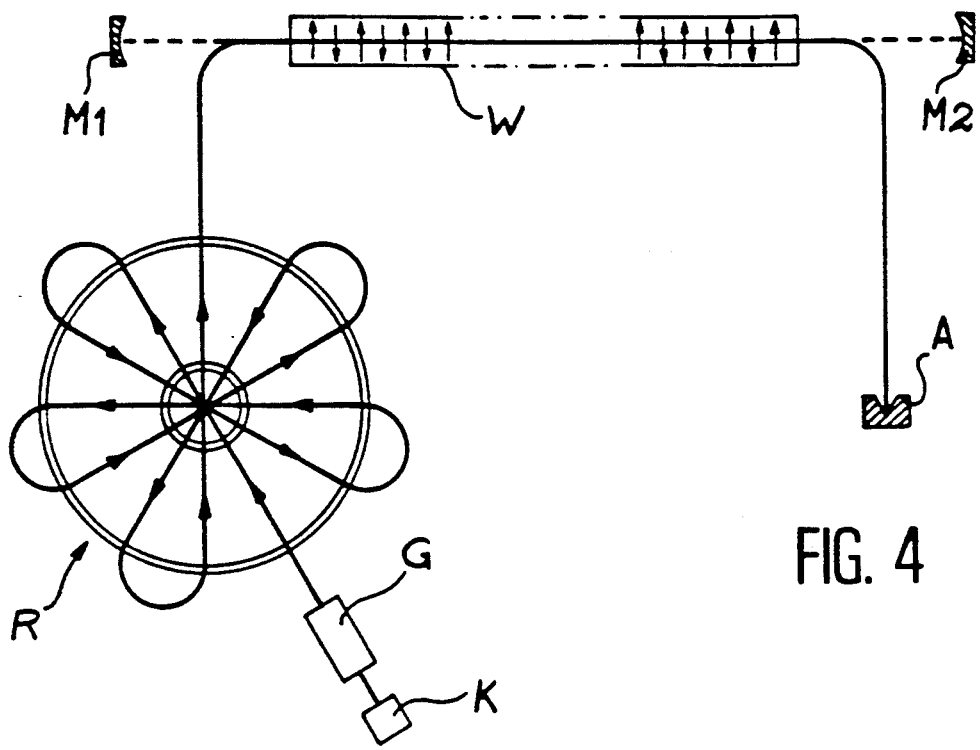
FIG. 4 A first variant of the free electron laser according to the invention of the lost beam type.

FIG. 4 shows a free electron laser according to the invention in a so-called "lost beam" variant. As shown, the apparatus comprises an electron source K, possibly a buncher G, an accelerating structure R in which the beam is accelerated according to 6 different diameters, a wiggler W and an electron absorber A. Two mirrors M1 and M2 constitute a resonant cavity. The beam deflectors at the input and output of the wiggler are not shown.

Such a configuration has several advantages. Thus, it is well adapted to the injection of the beam into a long structure with a guidance magnetic field (axial or helical). It has a considerable operating and regulating flexibility with respect to the different parameters, whilst being simple and inexpensive.

This configuration suffers from disadvantages as a result of the fact that the energy of the output beam is lost, which leads to a mediocre efficiency and an emission of X-radiation. Moreover, the intensity of the electron beam is limited.

Figure 5:
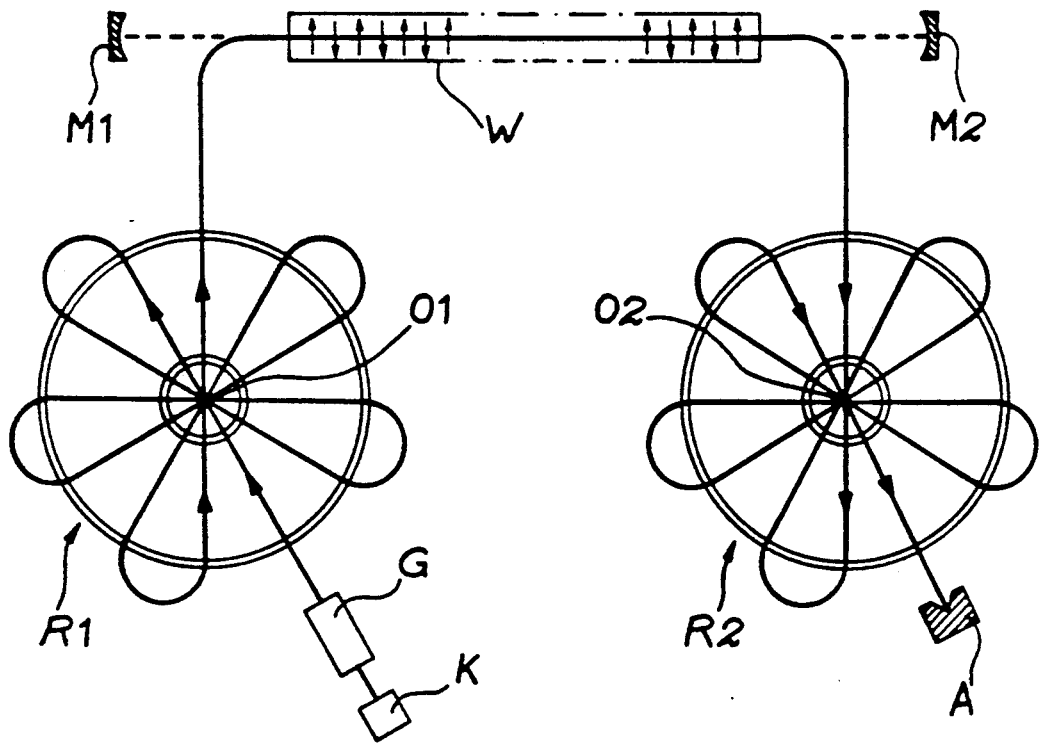
FIG. 5 A second energy recovery variant with two structures, one accelerating and the other decelerating.
Figure 6:
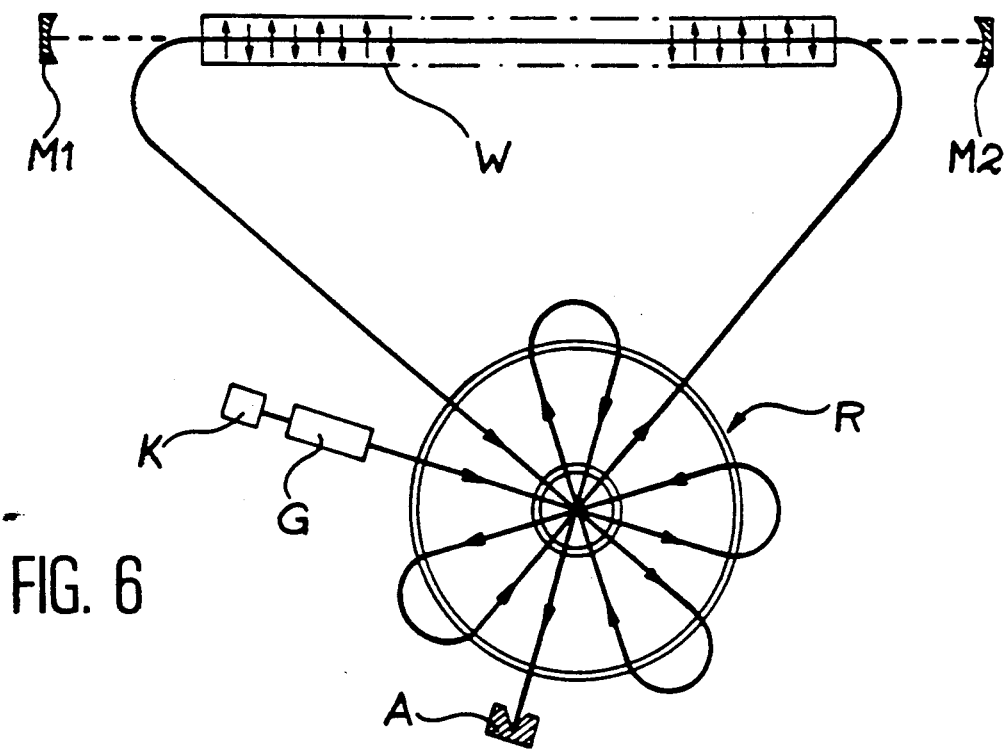
FIG. 6 An embodiment with energy recovery, but having a single accelerating-decelerating structure.

In order to obviate these disadvantages, the invention provides for energy recovery configurations as illustrated in FIGS. 5 and 6.

In FIG. 5, the installation comprises a second coaxial structure R2 with multiple passages identical to structure R1, but operating in deceleration.

As explained hereinbefore, the electrons are injected into the coaxial structure R1 in such a way that they pass to the centre 01 when the field has a phase equal to $3\pi/2+(2k\pi)$. In the coaxial structure R2, they must pass to the centre 02 with a phase equal to $\pi/2+(2k'\pi)$.

It is therefore necessary for the two cavities R1 and R2 to be supplied synchronously as regards frequency and phase and for the phase displacement of the field between the instants where the beam passes a final time through 01 and a first time through 02 is $$\frac{3\pi}{2} - \pi/2 = \pi$$

(to within $2k''\pi$).

The length L of the path covered by the electrons between 01 and 02 across the wiggler must therefore be such that $2\pi F \cdot L/v = (2k''+1)\pi$, in which v is the velocity of the electrons and F the frequency, i.e. $L = v(2k''+1)/2F$.

In the embodiment of FIG. 6, it is the same coaxial structure R which is used as an accelerator and a decelerator, said double effect being obtained by acting on the injection times of the electrons into the cavity: $3\pi/2$ (or $-\pi/2$) for the acceleration and $\pi/2$ for the deceleration. The length L of the loop covered by the electrons remains defined by the aforementioned relation.

Naturally, the interest of recovering the energy for improving the efficiency of the laser is only real if the energy of the beam is high compared with the energy lost by the Joule effect in the walls of the coaxial cavity. This is the case with cavities having a very high over-voltage coefficient and in particular for superconductor cavities, which can advantageously be used in the present invention. However, an interest still exists if it is wished to reduce the X-radiation associated with the absorption of the output electron beam.

In the variant of FIG. 5, it is necessary to bring about a frequency tuning of the two cavities and to provide a coupling between the decelerating cavity and the accelerating cavity for reinjecting the recovered power of the first into the second. However, this coupling modifies the resonance frequencies, the assembly of the coupled cavities then resonating on two frequencies spaced by a quantity dependent on the coupling. For these reasons, the single cavity variant of FIG. 6 is preferred.

Figure 7:
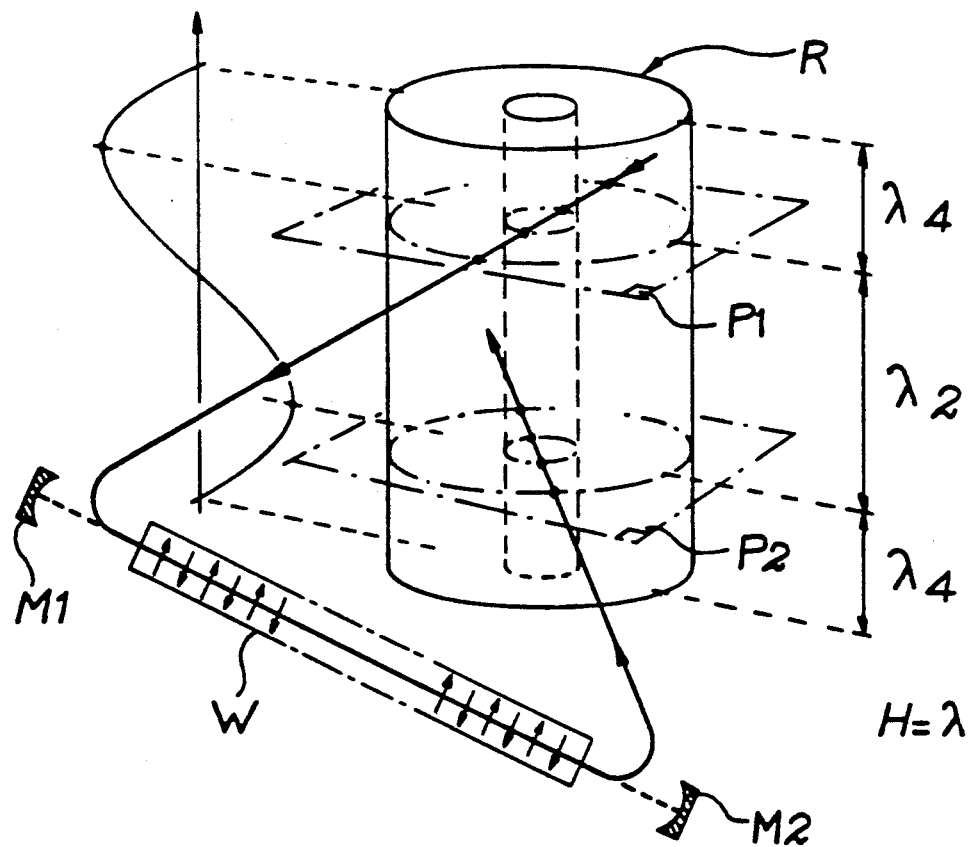
FIG. 7 An embodiment with energy recovery and a single accelerating-decelerating structure operating on two different planes.

A possible embodiment with one cavity operating both as an accelerator and a decelerator is shown in FIG. 7. The coaxial cavity resonates at $\lambda$ and therefore has two planes P1 and P2 for which the electric field is purely radial and of a maximum amplitude (or and this amounts to the same thing, two planes where there is no interfering deflecting magnetic field). These planes are located at $\pm H/4$ from the median plane, if H designates the cavity height and which is equal to the wavelength $\lambda$.

The plane P1 is used in acceleration (a single passage is shown, but in practice there are several of them) and the plane P2 in deceleration, the difference being obtained, as stated, by acting on the time at which the beam is introduced compared with the phase of the field established in the cavity.

The solution of FIG. 7 also has the advantage of reducing by a factor of 2 the losses by the Joule effect.

Figure 8:
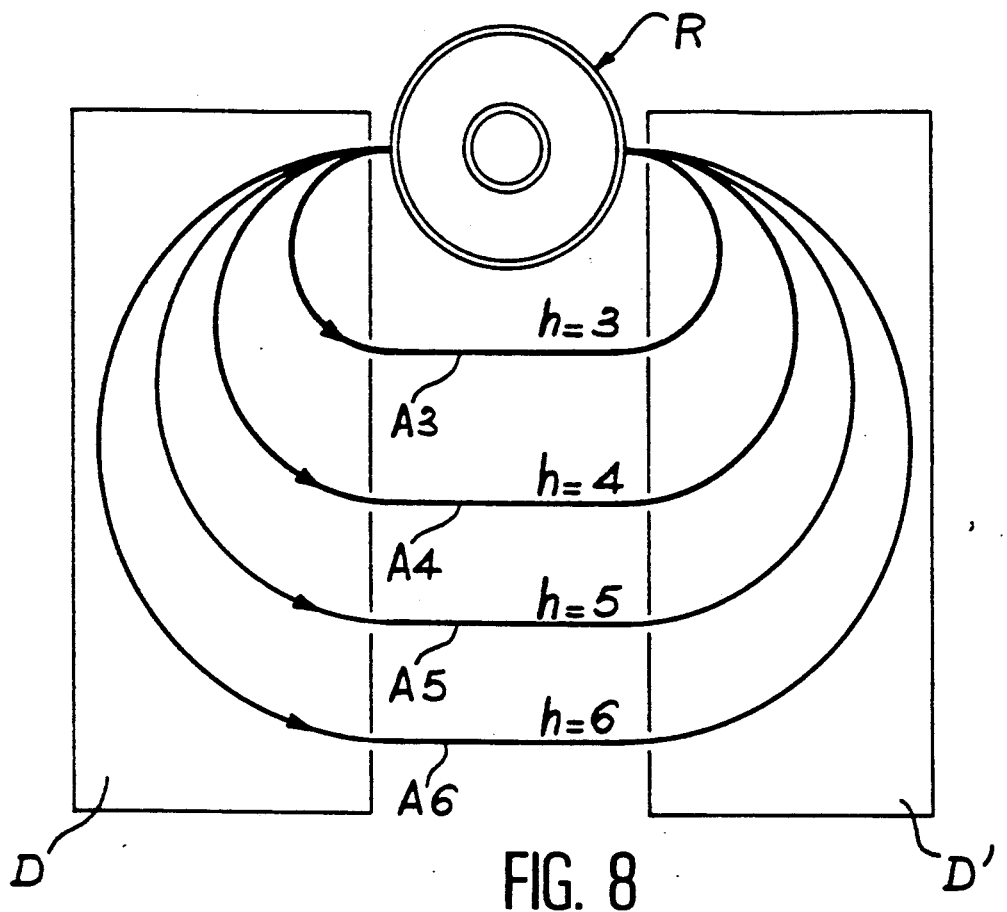
FIG. 8 Another variant with a storage ring.

According to another embodiment of the invention the coaxial accelerating structure can be combined with a known type of storage ring in accordance with FIG. 8. In the latter two magnetic deflectors D and D' impose an induction and ensure the deflection of the electron beam along circular arc trajectories, whose radius is dependent on the energy of the electrons. This radius r is given by $$r = \frac{mv}{|q|B}$$

in which m is the mass of the electron (taking account of relativistic effects), k its charge and B the magnetic induction.

Thus, the length of two semicircular trajectories is equal to $$\frac{2\pi mv}{|q|B}$$

to which must be added the length 2l of the two rectilinear arms, namely $$L = 2 + \frac{2\pi mv}{|q|B}$$

It is possible to define "resonant" trajectories, when the length L is a multiple of the wavelength $\lambda$ of the field established in the cavity, namely $L = h\lambda$. Electrons launched on a resonant trajectory will pass through the centre of the cavity at instants still corresponding to the same phase of the field, i.e. in practice with a phase displacement equal to $\pi/2$, to within a multiple of $2\pi$.

FIG. 8 also shows a few resonant trajectories for h equal respectively to 3, 4, 5 and 6.

Figure 9:
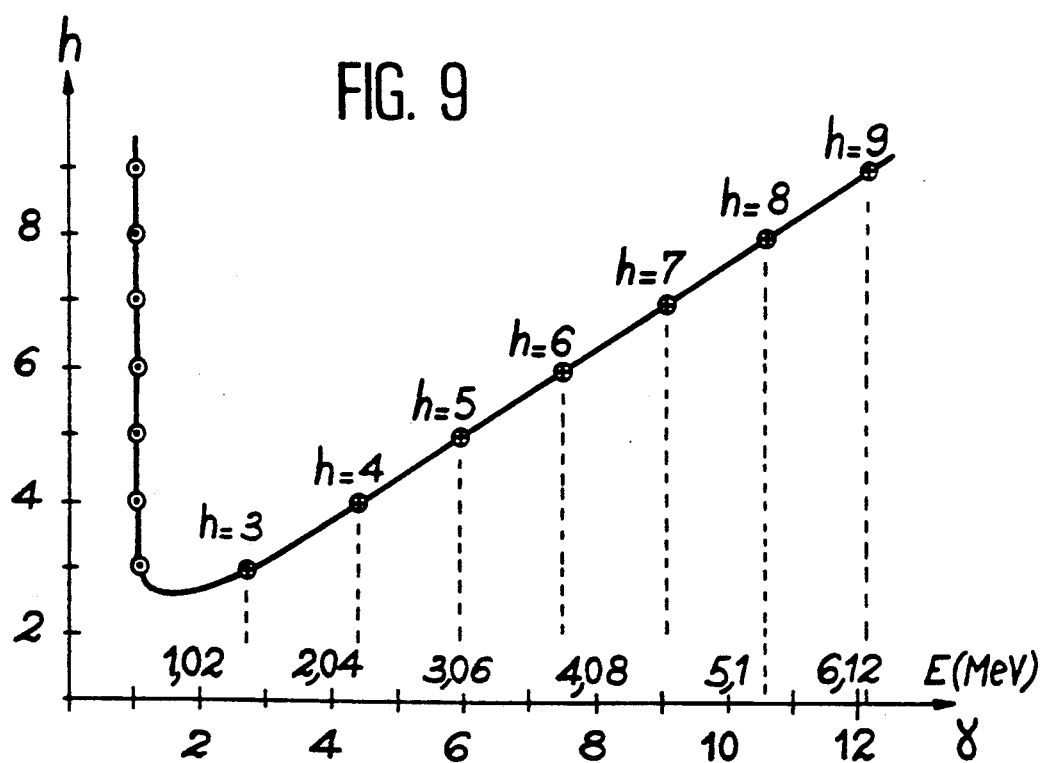
FIG. 9 An energy diagram for a storage ring structure.

FIG. 9 shows a curve with the number h on the ordinate and the energy E in MeV on the abscissa or and this amounts to the same thing, a coefficient $\gamma$ equal to $m/m_o$ in which $m_o$ is the electron rest mass and m the mass at its real velocity. The vertical branch corresponds to the case where the relativistic effects are negligible ($\gamma=1$) and the inclined branch to the case where the relativistic effects dominate. This curve corresponds to the case where the frequency of the field is 180 MHz, the induction B is $10^{-2}$ Tesla and the length L of the rectilinear arms is 1 m.

In this configuration, the coaxial accelerating cavity fully fulfils its function if the acceleration is such that the electron passes from a resonant orbit of order h to a resonant orbit of order h' exceeding h (e.g. h'=h+1). This condition can be obtained by acting on the injection time and on the amplitude of the HF field.

In certain cases, it would be possible to use constant energy trajectories, the coaxial structure neither accelerating nor decelerating the electrons passing through it. The condition on the injection of the beam is that the latter passes to the centre of the cavity when the field has a phase equal to $\pm \pi$ (or 0). A stationary energy trajectory is then obtained. It is possible to demonstrate that these trajectories are stable for a phase $\pm \pi$ (i.e. a minor disturbance of the phase about $\pm \pi$ leads to an effect opposing a certain disturbance and bringing the phase to the correct phase) and which is unstable for the phase $O$.

In general terms, the phase range in which the stability is ensured is between $\pi/2$ and $3\pi/2$, with an acceleration in the vicinity of $3\pi/2$ and deceleration in the vicinity of $\pi/2$. As the energy of the electrons is dependent on the phase at which they are injected, to this phase range corresponds an energy range where the stability is ensured.

Figure 10:
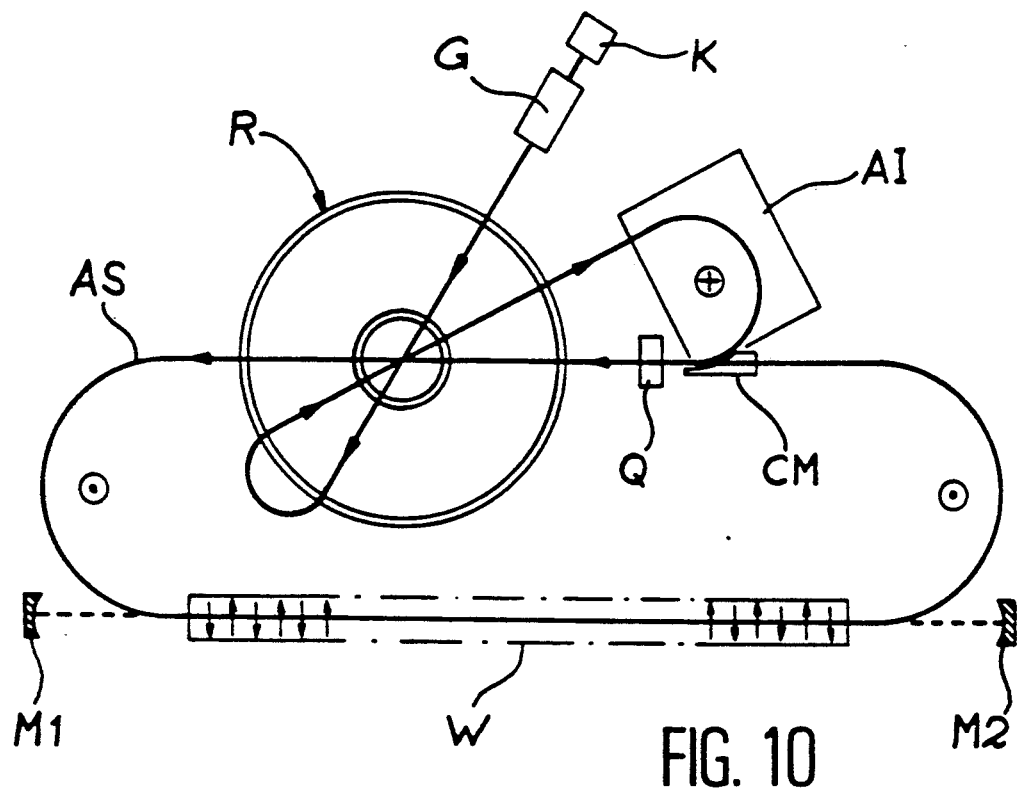
FIG. 10 Another variant using a storage ring maintained by an accelerator according to the invention.
Figure 11:
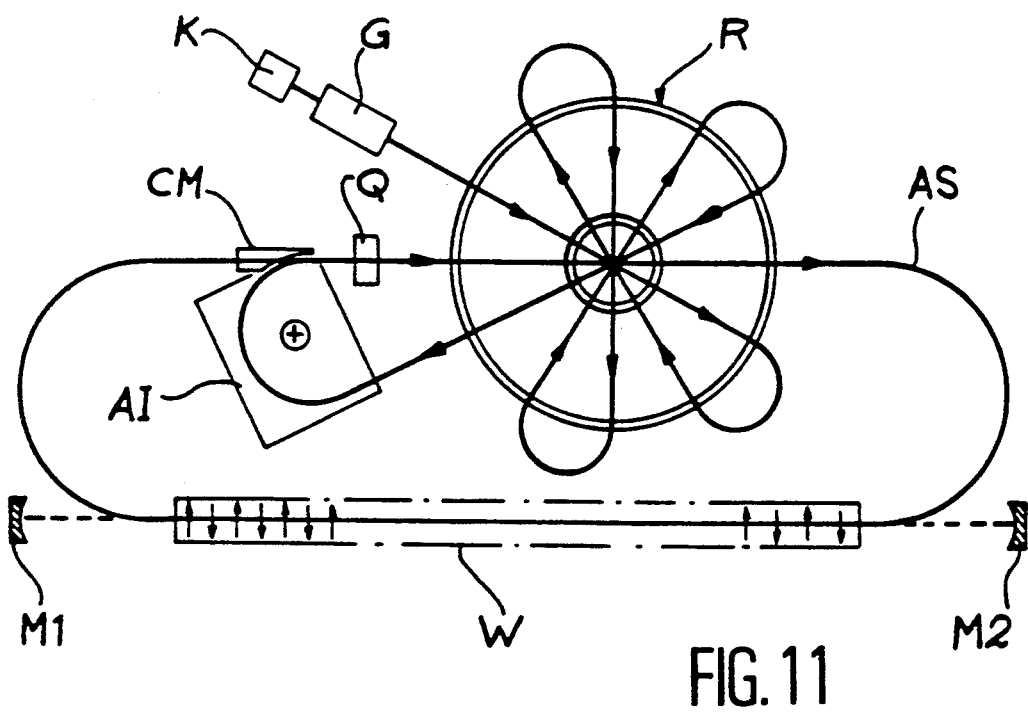
FIG. 11 Another embodiment with a storage ring maintained by an accelerator according to the invention.

FIGS. 10 and 11 show the complete structure of a free electron laser with an electron source K, a buncher G, a coaxial accelerating cavity R, an injection magnet AI, a wiggler W, two mirrors M1 and M2 and a magnetic conduit CM making it possible to inject tangentially into the storage ring AS.

FIG. 10 corresponds to the case where there are two accelerating passages in cavity R and a neutral passage for maintenance purposes on the storage ring.

FIG. 11 corresponds to five accelerating passages and one neutral passage. The number of accelerating passages is dependent on the energy desired for the electron beam in order to satisfy the tuning conditions in the wiggler.

It is possible to add to the apparatus a magnetic and e.g. quadrupole lens Q in order to make good possible variations in the trajectories and bring about a convergence of the electrons towards the centre of the coaxial structure R.

The realization of the storage ring configurations of FIGS. 10 and 11 is facilitated by the use of a magnetic conduit CM, which makes it possible to project the trajectory of the electrons of the storage ring with respect to the deflecting magnetic field necessary for curving the electron beam injected at the output of the accelerating stages. Such a magnetic conduit can either be constituted by a ferromagnetic material tube carrying the magnetic flux within the metal and allowing a very low magnetic field intensity value on its axis, or by a magnetic compensating winding making it possible to cancel out the magnetic field on the path of the electron beam from the storage ring.

The mixing of the electron trajectory at the output of the accelerator stages and the electron trajectory in the storage ring is facilitated by a remarkable property of the accelerator used according to the invention, which acts as a convergent lens and makes it possible to correct the angular separations which might exist with respect to the mixing of the trajectories.

I claim:

1. Free electron laser incorporating an electron source (K), an electron accelerator supplied by said source and supplying an electron beam, a magnetic wiggler (W) traversed by the electron beam and a mirror on each side of said wiggler, characterized in that said electron accelerator (R) is constituted by a coaxial structure having a coaxial cavity (CC) formed by an external conductor (10) and an internal conductor (20), a high frequency source (SHF) supplying the cavity (CC) with an electromagnetic field at the resonant frequency of said cavity, the radial component of a field (E) having a maximum in at least one plane (P) perpendicular to an axis of said cavity, the external (10) and internal (20) conductors of said cavity having diametrically opposite openings (11, 12, 13, 14, 15, 16) located in said plane (P) for the introduction of said electron beam into the cavity and its extraction in said plane, said accelerator also having at least one electron deflector (D1, D2) able to deflect said beam which has traversed said cavity along a diameter, whilst keeping it in the plane and then reinjecting it into said cavity along another diameter.

2. Free electron laser according to claim 1, characterized in that it comprises a means for recovering residual energy of said electron beam leaving said magnetic wiggler, said means being constituted by an electron decelerator ($R_1$ $R_2$) constituted by a coaxial structure and deflectors identical to those of said accelerator, the beam leaving the magnetic wiggler being injected into said decelerator with a phase condition corresponding to a deceleration.

3. Free electron laser according to claim 2, characterized in that said decelerator ($R_2$) is separate from said accelerator (R).

4. Free electron laser according to claim 2, characterized in that said decelerator coincides with said accelerator (R).

5. Free electron laser according to claim 4, characterized in that said coaxial cavity (CC) is supplied with an electromagnetic field at a frequency corresponding to a resonance mode having two planes (P1, P2), in which the radial component of the electric field is at a maximum, said electron source (K) supplying an electron beam injected into the cavity in one of said two planes (P1) with a phase condition corresponding to successive accelerations according to different diameters (d1, d2) all located in said plane, said electron beam from said wiggler (W) being injected into said cavity (CC) in the other of said two planes (P2) with a phase condition corresponding to successive decelerations.

6. Free electron laser according to claim 1, characterized in that it comprises an electron storage ring between an outlet opening of said coaxial cavity and an inlet opening of said coaxial cavity, said ring having two rectilinear branches and two circular arc branches, said wiggler being located on one of the rectilinear branches of said ring.

7. Free electron laser according to claim 1, characterized in that the electrons from the storage ring traverse said cavity (CC) with a phase condition corresponding to a neutral state with neither acceleration nor deceleration.

* * * * *